United States Patent Office 2,970,422
Patented Feb. 7, 1961

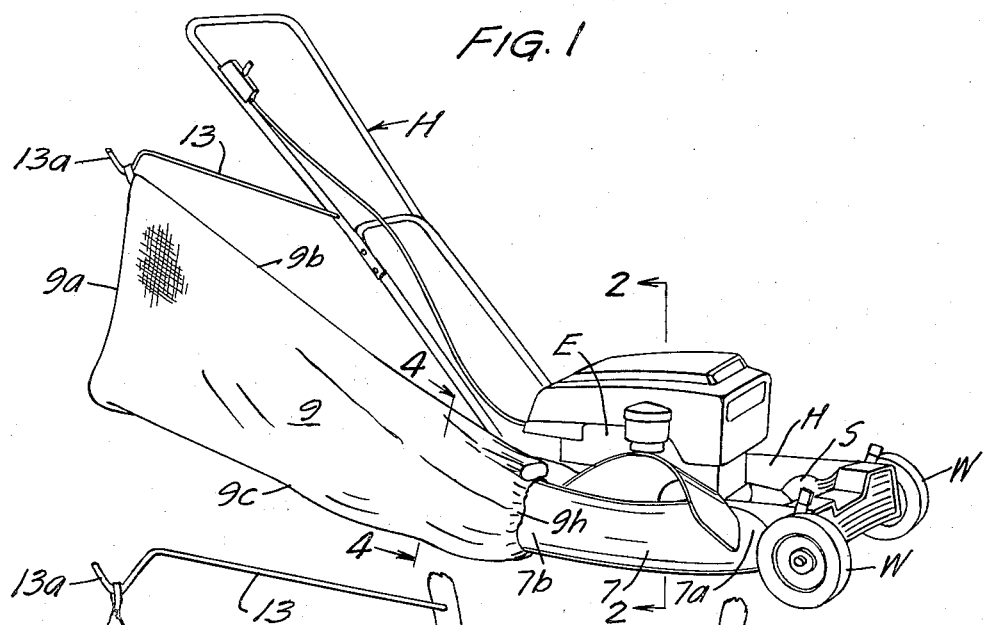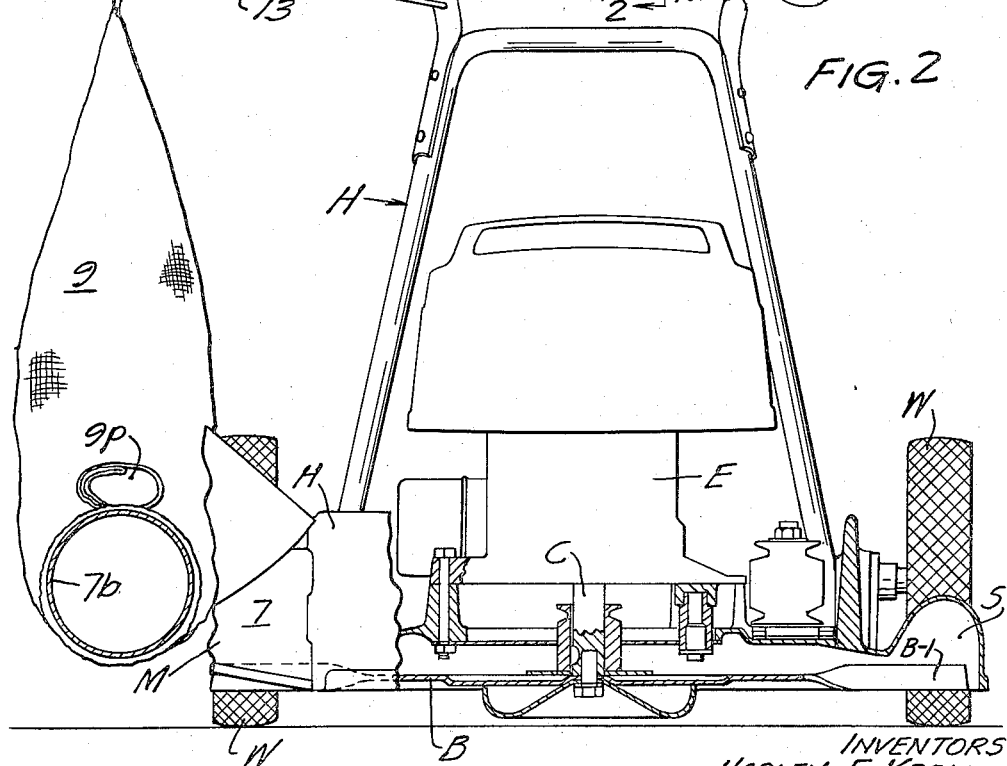

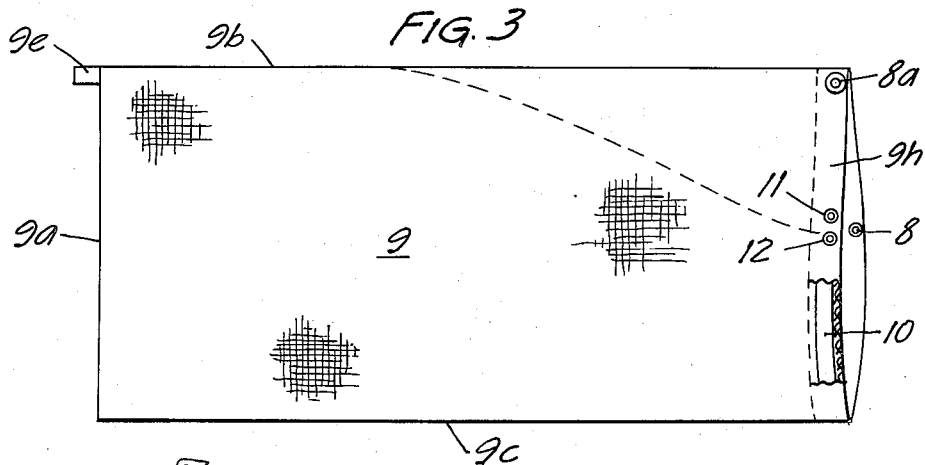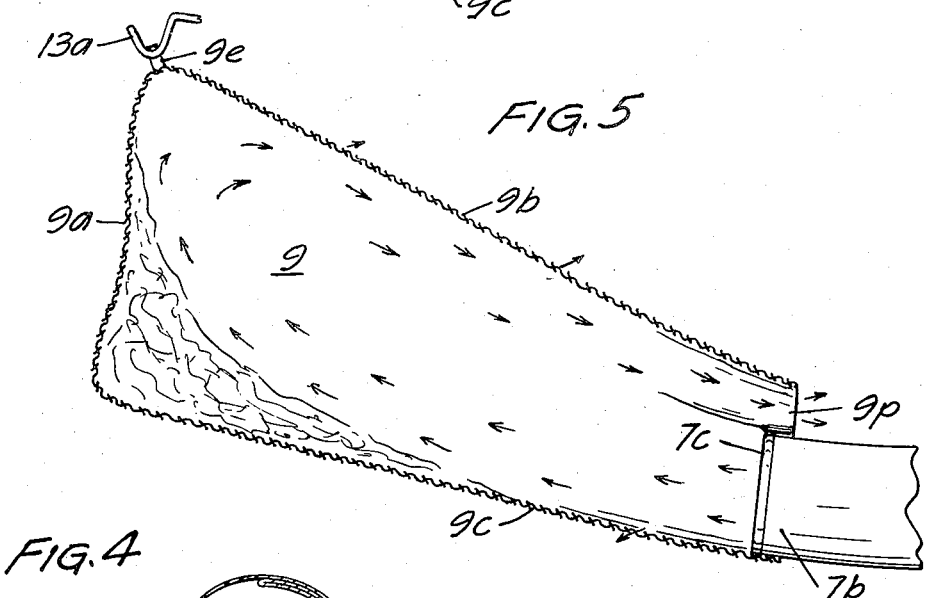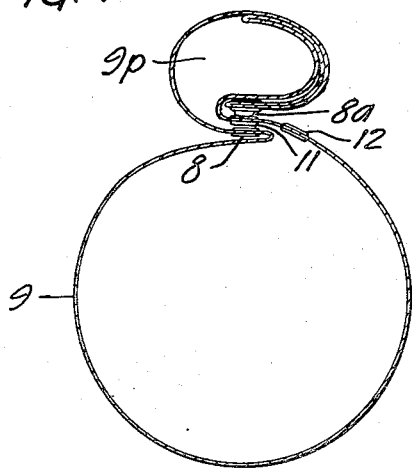

2,970,422
COLLECTION BAG ATTACHMENT FOR LAWN MOWERS

Harley Emerson Kroll, Hopkins, and Herbert Frank Horner, Minneapolis, Minn., assignors to Toro Manufacturing Corporation, Minneapolis, Minn., a corporation of Minnesota Filed Mar. 26, 1959, Ser. No. 802,176

6 Claims. (Cl. 56—202)

This invention relates to a high capacity bag attachment for certain types of lawn mowers which functions as a collection and disposal medium for the cut or chopped grass, leaves and other debris discharged from a lawn mower.

Many power-mowers particularly of the rotary type are provided with inverted channels or housing-portions which discharge cut grass and comminuted leaves, twigs and other debris at substantial velocity. The prior art shows some revolving reel-type lawn mowers which forcibly discharge upwardly and rearwardly the sheared clippings from a central discharge outlet.

In recent years, many manufacturers of power rotary mowers have employed a circular, semi-circular or volute channel of inverted construction built into the main housing of the rotary mower and terminating in a wide discharge mouth directed usually laterally or rearwardly of the machine. In such rotary mowers, a lifting effect is created through the rapid revolution of the cutting blades which with the cooperating directional revolution of the blades, creates a high velocity discharge of the "clippings" produced in operation of the mower. Our bag attachment is particularly adapted although not restricted for use with power lawn mowers of the last mentioned type.

While the prior art shows the use of some flexible, air-permeable bags for collection purposes, both with reel-type and rotary lawn mowers for the purpose of replacing the old fashioned plate-bottom grass catchers, such prior art devices have usually been of small capacity and could not be easily and quickly emptied when filled. Furthermore, for the most part they have been cumbersome and obstructive, making mowing in close areas and under low hanging shrubbery, difficult if not impossible.

It is an object of our present invention to provide an extremely simple, inexpensive and highly efficient bag attachment which will readily lend itself for practical use for power lawn mowers of many types, and through the use of which a large quantity of clippings may be collected with facilities permitting quick and easy emptying and disposal of the contents.

A further object is the provision of a collection-bag attachment of the class described which provides in its structure a chute element adapted for ready attachment to a number of types of rotary lawn mowers, when attached defining an annular, blower-type discharge for close cooperation with our novel bag structure which may be instantly and operatively connected therewith by simple snap coupling of a connector member with the attendant support of the rear end of the bag as by simple loop connection with an outstanding supporting rod connected with the handle of the mower, such chute connection structure enabling the full area of the mouth of the bag to be instantly opened for dumping of the accumulated clippings.

Another object of the invention is to provide a bag attachment of the class described wherein a number of types of power mowers may be adapted for high velocity blower-type discharge and wherein a high capacity, flexible collection bag may be readily disposed and supported in low-hanging, trailing position relative to the mower housing, extending longitudinally of the line of travel and not interfering with edge trimming or cutting below low-hanging shrubbery.

A still further and important object is the provision of a highly efficient clippings-collection bag with a tubular discharge chute from a mower wherein in accumulating collections, the bag is filled from the rear to the front, the air laden with clippings entering the bag with a relatively high velocity and first passing to the rear of the bag where the clippings are centrifuged out of the air stream with the air thereafter reversing its direction of travel and passing forwardly with provision of forwardly disposed air outlet at one side (preferably above) of the intake to the bag.

The foregoing and other objects will be more apparent from the following description made in connection with the accompanying drawings wherein like reference characters refer to similar parts throughout the several views and in which:

Fig. 1 is a side perspective view showing a form of the invention operatively attached to a well known power rotary mower;

Fig. 2 is a vertical cross section on a larger scale taken through the mower and bag-chute substantially along the line 2—2 of Fig. 1;

Fig. 3 is a plan view on an enlarged scale of a preferred form of our bag laid out flatwise and showing in dotted lines the napped over or folded over relation of the upper longitudinal corner of the bag as it is disposed and connected in use to constitute an overlying air exhaust passage disposed eccentrically of and preferably above the air entrance passage of the bag;

Fig. 4 is a vertical cross section taken through the bag when distended and in operation substantially along the line 4—4 of Fig. 1 and looking in the direction of the arrow; and Fig. 5 is a vertical section on the scale of Figs. 3 and 4 taken longitudinally through the bag in operation, diagrammatically showing air currents and centrifuging and deposit of clippings.

Referring now to the drawings a power mower of the rotary type is illustrated, portions thereof being broken away and others shown in vertical section in Fig. 2 and comprising a rigid housing designated as an entirety by the letter H, having integrally formed therewith an inverted spiral or involute tunnel S terminating as shown on the right side and forward portion of the housing to form a discharge mouth M.

The housing is mounted in a conventional manner upon ground-engaging wheels W and has affixed to the top central portion thereof, a motor or engine E. The engine is provided with a depending crank shaft C to which is affixed the substantially horizontal shank of cutting blades B, said blades revolving in their orbit at the open bottom or at some portions within the confines of the bottom of the involute channel S. The engine revolves blades B in a clockwise direction when the mower is viewed from the top and rear, thus impelling clippings at high velocity toward and through the discharge mouth M. The blades B in conventional manner, have turned portions B-1 which in revolution produce an upward lift upon the grass and cuttings and in combination with the involute channel S producing a high velocity, blower-type discharge of air laden with clippings.

Constituting in most applications of the invention, a component, is a chute-forming shell 7 having an underlying concavo-convex forward bottom 7a which when attached closes the underside of the discharge mouth M forming a generally cylindrical chamber therewith. The rearward portion of the shell 7 is tubular in construction and curved rearwardly terminating in an annular discharge sleeve 7b which at its rear peripheral extremity is provided with an enlargement or bead 7c to facilitate connection with the bag of the invention.

The unique bag of the invention is constructed from highly flexible and readily air-pervious material such as loosely woven textile fabrics, for example osnaburg or hopsacking and as shown in Fig. 3, may conveniently be constructed from a single ply or sheet of such material 9. Although the bag is constructed of an air-pervious textile material it is of course understood that most of the air blown into the bag will be retained within the interior thereof so that only a relatively small amount of such air will escape through the fabric during the operation of the mower. The purpose of this degree of perviousness of the fabric of which the bag is made when subjected to air under pressure will be more fully explained hereinbelow. In constructing the bag, a sheet of the said material may be folded upon itself as shown in Fig. 3 and the overlapping rear marginal edges stitched together along a turnover seam 9a to close the rear of the bag, while overlying longitudinal edges 9b and 9c are seamed together to close the peripheral wall of the body formed. The forward edge of the fabric sheet is hemmed as shown throughout its length forming hem 9h and a narrow reinforcing strip 10 is preferably inserted and attached to that portion at least of the hem which is connected in tubular fashion with the discharge extremity 7b of the chute-forming shell.

Secured to the hem 9h of the bag and projecting inwardly toward an opposed portion of the hem is the clinched, elongated stud element 8 of a conventional snap-fastener. When the bag is disposed flatwise as shown in Fig. 3, stud 8 is intermediately disposed of the width of the doubled structure and is adapted to accommodate loosely and selectively, a series of simple grommets 11 and 12 as shown, which are clinched upon apertured portions of the hem 9h to form when either of the grommets are interconnected with stud 8 an annular attachment portion in the looped lower part of the bag for snugly engaging the sleeve 7b of the chute just forwardly of the bead 7c. By providing two or more grommets spaced along the hem, annular attachment portions may be obtained of varying circumference whereby the bag may readily be attached to discharge chutes of lawn mowers which will normally vary somewhat in diameter and circumference in accordance with the size of the mower. The edges of the hem 9h apart from grommet connection with the stud member 8 as previously recited and an additional foldover connection to be described, are entirely free and disconnected, leaving an open slotted portion disposed outwardly and as shown, above and eccentrically of the tubular connection with the sleeve 7b of the discharge shell.

A conventional spring socket element 8a of a snap fastener element is clinchedly secured to a doubled hem area of the forward edge of the bag, as shown in Fig. 3, at the top doubled edge of the hem. The clinched hem portion is of course provided with suitable small apertures aligned with the socket. The edges of the hem 9h are disconnected and free between the socket element 8a and the connection of the stud element 8 with one of the two grommets 11 and 12, forming a forward air discharge passage 9p.

When the bag is operatively applied to the chute sleeve 7c, the appropriate grommet 11 or 12 is first passed over the stud 8 with the lower hemmed portion of the bag extending then annularly and in snug relation with the sleeve. Thereafter, the socket element 8a is brought downwardly and in so doing, the longitudinal upper corner of the doubled portion of the bag is folded over diagonally and the socket element is then operatively and positively connected with the head of stud 8. This folding over of the longitudinal forward corner of the bag diminishes the forward end thereof, forming a taper which still leaves the air discharge passage 9p open although in then narrow oval configuration as shown in Fig. 2.

The bag is preferably supported at the upper corner of the rear end thereof by suitable means such as a resilient rod member 13, the inner end of which is removably secured in apertured portions or ears provided by the guiding handle H of the mower. Rod 13 terminates in a hook 13a which removably receives and retains a reinforced loop 9e stitched or otherwise affixed to the upper rear corner of the bag 9.

*Operation*

The functioning of our novel bag and its relation with the discharge chute is diagrammatically illustrated in Fig. 5. Air laden with clippings is discharged at high velocity into the lower annular receiving end of the bag passing longitudinally and rearwardly through the bag where the air current is turned and reversed and such air as is not forced through the meshes, or pores of the bag, is then directed forwardly after centrifuging out in the turn the clippings and solid material backed up against the back of the bag. The forward and slower moving current of air may be exhausted through the elongated oval air discharge slot or passage 9p in a forward direction.

Thus it will be seen that in operation, the bag fills with clippings from the rear thereof forwardly, enabling the bag to contain and accumulate the maximum amount of clippings. The bag, distended by air and the accumulated material therein, assumes the configuration and is disposed in the position illustrated in Fig. 1, lengthwise of the machine and longitudinally of the line of travel thereof in operation. It does not occupy, to any considerable extent, space disposed laterally and to the right side of the wheels of the mower and as will be seen from Figs. 1 and 2, the rear supported end of the bag and the supporting rod 13 are low-hung, the maximum height of the rod being slightly above the top of the engine E, so that the device with bag attachment applied may mow grass under overhanging shrubbery without interference and may also cut or trim close to an edge or obstruction.

To remove the bag 9 when it is filled or partially filled, it is only necessary to with one hand impart a sharp outward tug upon the corner which is previously folded over and secured by the spring socket snap element 8a to the stud 8. Such a tug disconnects the two elements of the snap fastener and the engaged grommet will normally slide off of the stud 8, thereby substantially freeing the entire forward hem edge of the bag. Then the bag, after slipping off the supporting loop 9e from the hook 13a may be very quickly dumped at a desired location. As contrasted with bags of the prior art, no loosening or unshirring of a forward bag end is required, nor is the discharge in any way restricted when the front end of our bag is uncoupled.

From the foregoing description it will be seen that we have provided an extremely simple, inexpensive and highly efficient bag attachment adapted to be readily applied to many conventional makes of power mowers and detachable when filled, instantly and easily.

It will further be seen that the functional entrance of air laden with clippings and redirection of air currents from the back of the bag rearwardly, causes a centrifuging of the clippings backed up against the rear of the bag and accumulating forwardly as distinguished from the distribution of clippings or debris in bags of the prior art. It will further be seen with out structure that an adaptor in the form of a discharge tube shell may constitute a component of our attachment for readily converting several types of power mowers to have a suitable tube discharge for bag attachment.

The term "clippings" as used herein and in the claims signifies the cut or partially comminuted material from cut grass, weeds or mulched leaves, twigs and other debris.

It will of course be understood that various changes may be made in the form, details, arrangement and proportions of the parts without departing from the scope of the invention.

What is claimed is:

1. A clipping-collection bag for lawn mowers adapted for attachment to a tubular discharge element provided by the mower comprising a bag constructed of flexible, readily air-pervious material, said bag having a closed outer end, a restricted forward mouth portion detachably surrounding and substantially sealed with the outer end of said discharge element, said bag further having a substantially forwardly extending air-discharge opening at the forward end thereof and disposed in eccentric relation to said discharge element whereby air entering the bag with relatively high velocity and carrying clippings, will reverse its course in curved manner within the outer end of the bag depositing such clippings in the rear of the bag and then exhaust, at least in part, through said open air discharge at the forward end of the bag.

2. A clippings-collection bag for lawn mowers of the type employing a tubular discharge element adapted to longitudinally discharge clippings comprising, an elongated bag constructed of highly flexible, readily air-pervious material, said bag having a closed outer end and fully opened forward end to provide an unobstructed emptying opening, said bag at said open end having a fastening element to secure opposite intermediate portions of said forward end to snugly surround in tubular formation, the outer end of said tubular discharge element while leaving a substantially unrestricted air discharge slit constituting a substantially forwardly extending air-discharge opening defined by the remainder of the forward annular edge of the bag not utilized to surround said tubular discharge element whereby air laden with clippings entering the bag at relatively high velocity, will first pass to the rear of the bag, depositing such clippings by centrifugal force while in curved manner reversing its travel with of course loss of velocity and exhausting at least in part through said discharge opening at the forward end of the bag.

3. The structure set forth in claim 2 further characterized by an additional fastener element secured to a doubled portion of the forward annular edge of the bag intermediately disposed of the fastening elements for securing the bag to the tubular discharge, said last mentioned fastener element being engageable with said first mentioned fastener with the forward corner of the bag diagonally folded to restrict said forward air discharge opening while producing a forwardly tapered general contour in the bag.

4. A clippings-collection bag for lawn mowers adapted for quick attachment to tubular discharge element provided by the mower, comprising a bag constructed of flexible, readily air-pervious material and having a substantially closed rear end, said bag having a substantially fully opened forward end disposable in generally annular fashion, the edge defining said forward end having an intermediately disposed snap fastener element secured thereto, a grommet secured to another portion of said forward edge and connectible with said snap fastener element and spaced along said edge a distance substantially equal to the circumference of the tubular discharge element of said mower to cause said edge between said element and grommet to snugly surround said discharge in annular form, and said bag having a complementary snap fastener element secured to said forward edge at a point spaced some distance from both said first snap fastener element and said grommet whereby a forward longitudinal corner of the bag may be diagonally folded to engage and lock said last mentioned snap fastener element with said first element with the grommet secured therebetween while nevertheless leaving outwardly of said grommet connection an open slotted air space constituting a substantially forwardly extending air-discharge opening for forward discharge of air from said bag.

5. A bag attachment for lawn mowers of the type employing an inverted channel discharge for air and clippings having in combination a discharge-tube-forming shell having a portion for underlying the mouth of said channel discharge to form therewith a substantially cylindrical passage and also having an outwardly projecting sleeve member which communicates with the cylindrical passage formed as recited, and an elongated clipping collection bag constructed of flexible readily air-pervious material and having a substantially closed rear end and a reduced, readily disconnectible forward end for surrounding said sleeve and making attachment therewith, said bag further having a substantially forwardly extending air-discharge opening at the forward end thereof and disposed in eccentric relation to said shell, and means for supporting said bag from the rear closed portion thereof.

6. The structure set forth in claim 5 wherein the forward end of said bag may be fully opened with the edge defining said restriction free and instantly disconnectible fastener elements spaced apart a distance substantially equal to the circumference of said sleeve discharge member whereby the length of said forward edge between said elements will in annular fashion surround said discharge member and be connected thereto, the remainder of the forward edge of the bag remaining open to constitute said discharge opening whereby air laden with clippings will enter the bag at relatively high velocity, first passing to the rear of the bag and centrifugally depositing said clippings while thereafter in curved manner reversing its travel and exhausting at least in part through said opening at the forward end of the bag.

References Cited in the file of this patent

UNITED STATES PATENTS

| | | |
|---|---|---|
| 2,836,029 | Johnson | May 27, 1958 |
| 2,882,668 | Murillo | Apr. 21, 1959 |
| 2,882,670 | Stephens | Apr. 21, 1959 |
| 2,932,146 | Campbell | Apr. 12, 1960 |